United States Patent
Sakamoto et al.

(10) Patent No.: US 10,952,494 B2
(45) Date of Patent: Mar. 23, 2021

(54) OUTSOLE AND SHOE

(71) Applicant: ASICS Corporation, Kobe (JP)

(72) Inventors: Masanori Sakamoto, Kobe (JP); Yusuke Nishiura, Kobe (JP); Osamu Yamane, Kobe (JP); Kenichi Harano, Kobe (JP)

(73) Assignee: ASICS CORPORATION

( * ) Notice: Subject to any disclaimer, the term of this patent is extended or adjusted under 35 U.S.C. 154(b) by 0 days.

(21) Appl. No.: 15/750,457

(22) PCT Filed: Apr. 19, 2017

(86) PCT No.: PCT/JP2017/015726
§ 371 (c)(1),
(2) Date: Oct. 31, 2018

(87) PCT Pub. No.: WO2018/193555
PCT Pub. Date: Oct. 25, 2018

(65) Prior Publication Data
US 2019/0380431 A1    Dec. 19, 2019

(51) Int. Cl.
| | |
|---|---|
| *A43B 13/04* | (2006.01) |
| *A43B 13/22* | (2006.01) |
| *C08K 3/36* | (2006.01) |
| *C08K 5/548* | (2006.01) |
| *C08L 9/06* | (2006.01) |
| *C08K 5/00* | (2006.01) |
| *C08K 5/54* | (2006.01) |

(52) U.S. Cl.
CPC ............. *A43B 13/04* (2013.01); *A43B 13/22* (2013.01); *C08K 3/36* (2013.01); *C08K 5/0025* (2013.01); *C08K 5/5406* (2013.01); *C08K 5/548* (2013.01); *C08L 9/06* (2013.01)

(58) Field of Classification Search
CPC .......... A43B 13/04; A43B 13/22; C08K 3/36; C08K 5/0025; C08K 5/5406; C08K 5/548; C08L 9/06
USPC ......................................................... 524/575
See application file for complete search history.

(56) References Cited

U.S. PATENT DOCUMENTS

| | | | | |
|---|---|---|---|---|
| 3,526,606 A | * | 9/1970 | Fujimoto | .................. C08L 9/00 523/200 |
| 6,057,397 A | * | 5/2000 | Takagishi | .................. B60C 1/00 524/492 |

(Continued)

FOREIGN PATENT DOCUMENTS

| | | |
|---|---|---|
| EP | 2 805 637 A1 | 11/2014 |
| EP | 3 031 340 A1 | 6/2016 |

(Continued)

*Primary Examiner* — Kelechi C Egwim
(74) *Attorney, Agent, or Firm* — Katten Muchin Rosenman LLP

(57) ABSTRACT

An outsole is formed of a viscoelastic body containing a rubber component. This viscoelastic body has a loss factor measured by a dynamic viscoelasticity measurement under conditions of a temperature of 23° C., a frequency of 10 Hz, a static strain of 10%, and a dynamic strain of 7% being 0.17 or more, a storage elastic modulus measured by the dynamic viscoelasticity measurement being 5.7 MPa or less, and a ratio of a tensile stress at 300% elongation to a tensile stress at 100% elongation being 4.4 or more. Such outsole is excellent in wet grip performance and durability.

4 Claims, 4 Drawing Sheets

(56) References Cited

U.S. PATENT DOCUMENTS

| | | | | |
|---|---|---|---|---|
| 6,335,392 B1* | 1/2002 | Umezawa | ............... | A43B 13/04 |
| | | | | 524/269 |
| 7,662,874 B2* | 2/2010 | Korth | ..................... | C08K 5/548 |
| | | | | 524/191 |
| 2007/0037916 A1* | 2/2007 | Watanabe | .................. | B60C 1/00 |
| | | | | 524/493 |
| 2007/0197714 A1 | 8/2007 | Okamoto et al. | | |
| 2010/0154253 A1 | 6/2010 | Imazato et al. | | |
| 2014/0371383 A1* | 12/2014 | Hayata | ..................... | C08K 3/36 |
| | | | | 524/548 |
| 2016/0369015 A1* | 12/2016 | Doring | ................... | C08C 19/25 |
| 2017/0013910 A1* | 1/2017 | Oomura | ..................... | C08L 9/06 |
| 2017/0210881 A1 | 7/2017 | Miyazaki | | |

FOREIGN PATENT DOCUMENTS

| | | |
|---|---|---|
| JP | 3100592 B2 | 10/2000 |
| WO | 2008/146342 A1 | 12/2008 |
| WO | 2016/031460 A1 | 3/2016 |

* cited by examiner

OUTSOLE AND SHOE

TECHNICAL FIELD

The present invention relates to an outsole of a shoe and a shoe having the same.

BACKGROUND ART

Various shoes have a shoe body and an outsole attached to a lower surface of the shoe body.

In general, shoes are required to have performance durability allowing long-time use. In addition, grip performance against a ground is required as the performance of the shoes. Especially, since a wet ground is slippery, it is required to improve the grip performance against a wet ground.

In the present specification, the "grip performance" refers to a property in which slipping does not readily occur. Further, in the present specification, the "ground" refers to a surface with which an outsole of a shoe is in contact when the shoe is used. Examples of the ground include a surface of a paved road such as a sidewalk or an unpaved road; a surface of a natural object such as rocks in mountains or rivers; and a rough concrete surface of buildings. Hereinafter, in the present specification, "grip performance against a wet ground" may be referred to as "wet grip performance" in some cases.

Patent Document 1 discloses an outsole of a shoe constituted of a vulcanized molded article of a rubber composition. In the outsole of Patent Document 1, a base rubber of the rubber composition contains 70 to 100% by mass of a styrene-butadiene rubber. The styrene-butadiene rubber has a glass transition temperature (Tg) of −33° C. or more and −10° C. or less. In strain dispersion of dynamic viscoelasticity at a frequency of 10 Hz, a loss factor (tan δ) of the styrene-butadiene rubber at a dynamic strain of 2.0% and a temperature of −10° C. is more than 0.26 and 1.5 or less and a complex elastic modulus (E') at the same conditions is more than 150 kgf/cm$^2$ and 750 kgf/cm$^2$ or less.

However, the outsole of Patent Document 1 does not fully satisfy the grip performance against a wet ground.

CITATION LIST

Patent Document

[Patent Document 1] JP 3100592 B2

SUMMARY OF INVENTION

Technical Problem

An object of the present invention is to provide an outsole which has excellent grip performance against a wet ground and further has excellent durability, and a shoe having such an outsole.

Solution to Problem

The present inventors have focused on the fact that an outsole deforms as a shoe user walks on the ground, and the outsole particularly deforms greatly as the shoe user walks on an uneven surface.

Specifically, the present inventors have assumed that the shoe user walks on the uneven surface, and the following experiment was carried out in order to ascertain how much the outsole deforms at that time.

That is, a rubber composition heretofore generally used as an outsole (this rubber composition is formed of a mixture of styrene-butadiene rubber containing 23% by mass of styrene, silica, oil, sulfur, and a vulcanization accelerator) is stacked on an ethylene vinyl acetate foam and molded to prepare a test piece as shown in FIG. 1. As shown in FIG. 1, the test piece is formed of a rubber molded article having a thickness of 2 mm and a lower surface of 20 mm×20 mm, and a foam having a thickness of 2 mm and an upper surface of 40 mm×20 mm.

Meanwhile, a polymethyl methacrylate plate having a corrugated uneven surface in which protrusions and recesses having dimensions as shown in FIG. 2A were repeated was prepared. As shown in FIG. 2B, a lower surface of the rubber molded article of the test piece was placed on the uneven surface, and while a weight was placed on the test piece to apply a load of 100 N to the test piece, the test piece was slid horizontally at a speed of 30 mm/sec and at 23° C. under atmospheric pressure. As shown in FIGS. 2C and 2D, strain at a measurement point P when the test piece was slid was successively measured. The results are shown in FIG. 3. With reference to this graph, when the measurement point rides over one protrusion of the uneven surface (between $t_1$ and $t_2$), strain of the rubber molded article of the test piece greatly changes, and when the measurement point reaches the next protrusion ($t_3$), the strain greatly increases. As is apparent from FIG. 3, it is found that strain of the outsole with respect to an uneven surface having a relatively large unevenness difference is more likely to fluctuate around 10%. When shoes are actually used, it is considered that the shoe user walks on an uneven surface of the same degree as the plate used in the experiment. In this respect, it cannot be said that the actual use situation of shoes is taken into consideration under conditions such as a dynamic strain of 2.0% and a temperature of −10° C. as in Patent Document 1.

From the above experiments, the present inventors have considered that viscoelasticity characteristics at the usual operating temperature and when great deformation of the outsole occurs are important. Based on such findings, the present inventors further made intensive studies and completed the present invention in order to obtain an outsole having excellent wet grip performance and durability.

An outsole of the present invention is formed of a viscoelastic body containing a rubber component. The viscoelastic body has a loss factor [tan δ] measured by a dynamic viscoelasticity measurement under conditions of a temperature of 23° C., a frequency of 10 Hz, a static strain of 10%, and a dynamic strain of 7% being 0.17 or more, a storage elastic modulus [E'] measured by the dynamic viscoelasticity measurement being 5.7 MPa or less, and a ratio of a tensile stress at 300% elongation to a tensile stress at 100% elongation [M300/M100] being 4.4 or more.

In a preferred outsole according to the present invention, the rubber component includes a styrene-butadiene random copolymer rubber.

In a preferred outsole according to the present invention, an amount of styrene in the styrene-butadiene random copolymer rubber is 40% by mass to 55% by mass.

In a preferred outsole according to the present invention, the styrene-butadiene random copolymer rubber is contained in an amount of 80% by mass to 100% by mass relative to 100% by mass of the rubber component.

In a preferred outsole according to the present invention, the viscoelastic body further includes: silica; and a silane coupling agent having in a molecular structure a structure represented by at least the following Formula (2) between the following Formula (1) and Formula (2):

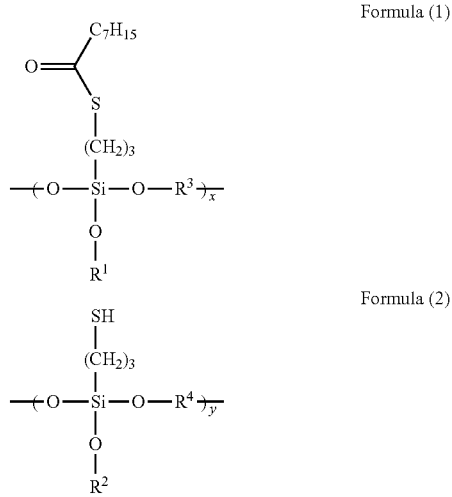

According to another aspect of the present invention, a shoe is provided.

The shoe is provided with any of the outsoles described above.

Advantageous Effects of Invention

The outsole of the present invention has excellent wet grip performance and durability.

A shoe provided with such an outsole of the present invention hardly become slippery when walking on a ground and also can be used for a long period of time.

DESCRIPTION OF EMBODIMENTS

Figure 1A:
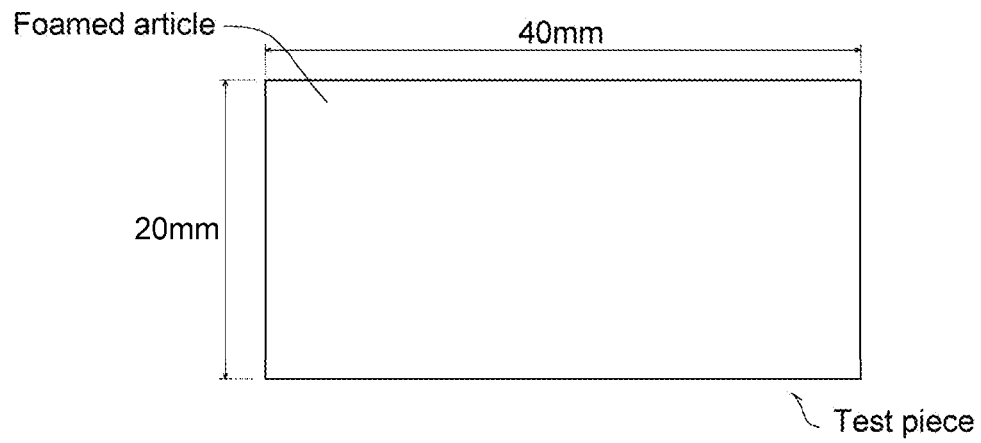
FIG. 1A is a top view of a test piece of a preliminary test.
Figure 1B:
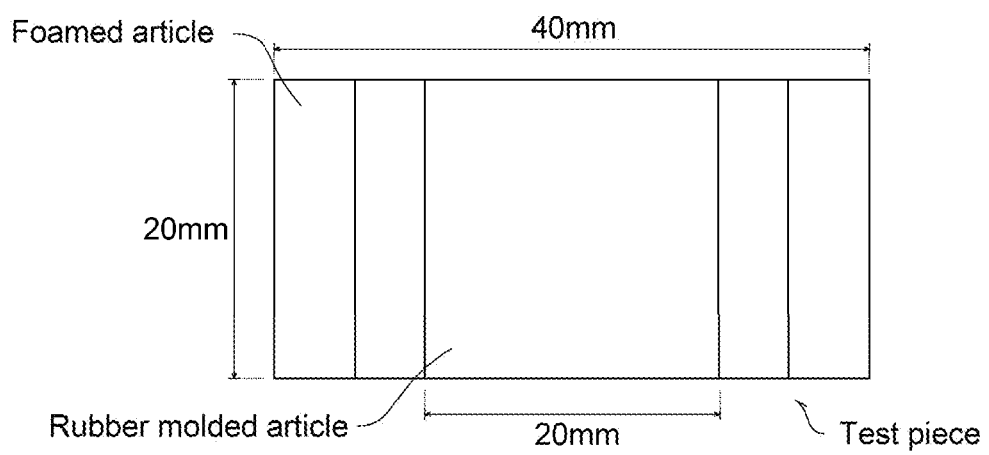
FIG. 1B is a bottom view thereof.
Figure 1C:
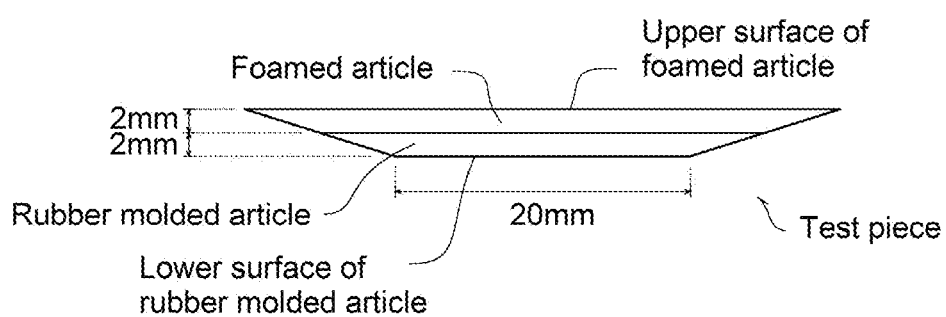
FIG. 1C is a side view thereof.
Figure 2A:
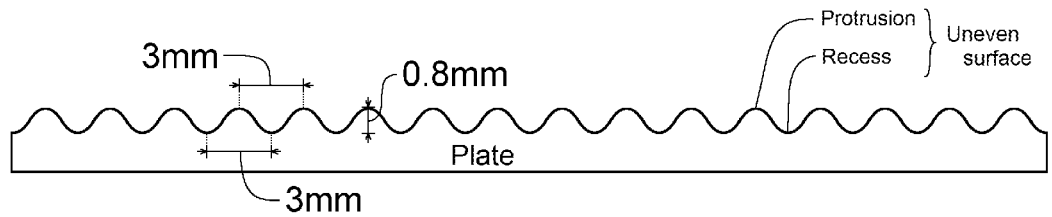
FIG. 2A is a reference side view of a plate having an uneven surface used in the preliminary test.
Figure 2B:
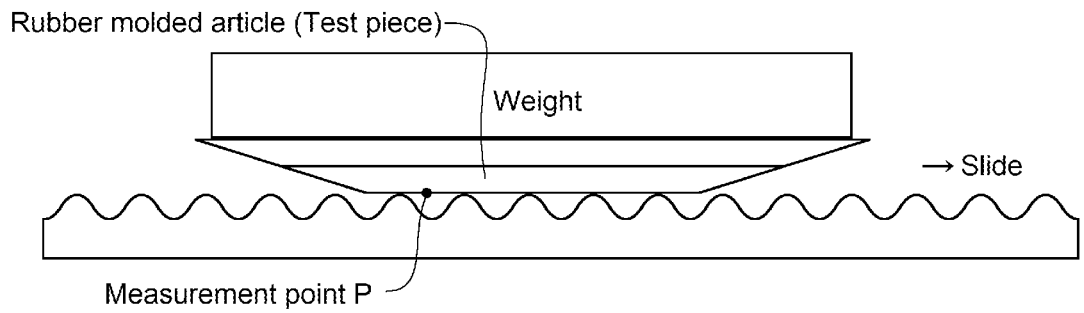
FIGS. 2B, 2C and 2D are reference side views for explaining a method of the preliminary test.
Figure 2C:
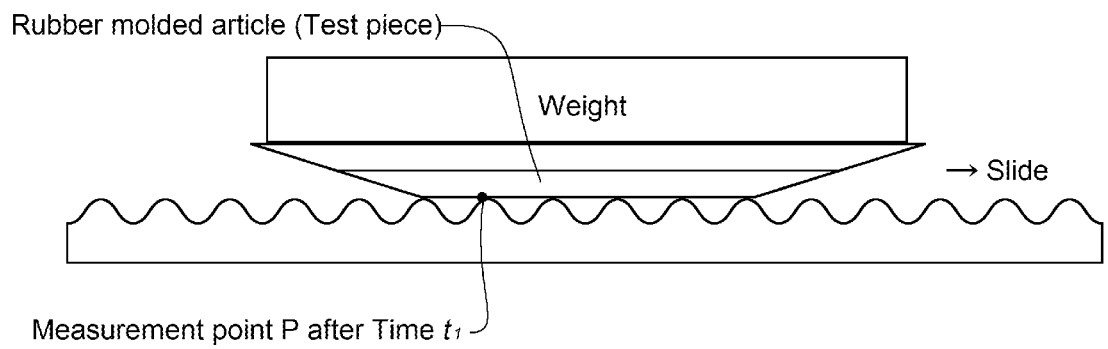
Figure 2D:
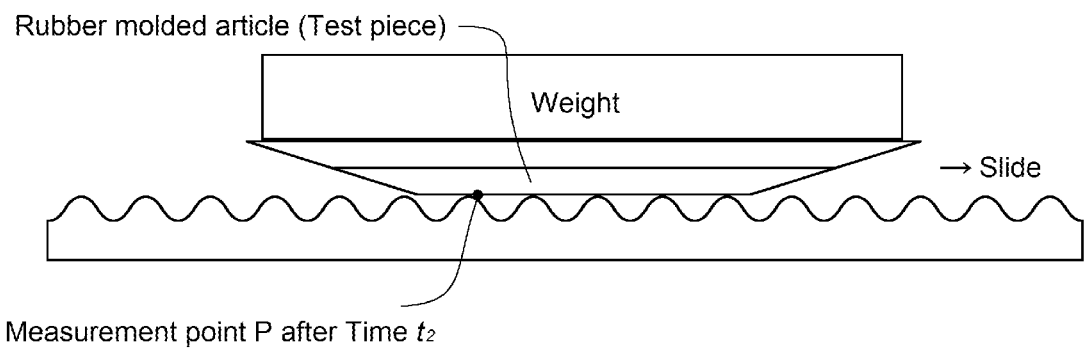
Figure 3:
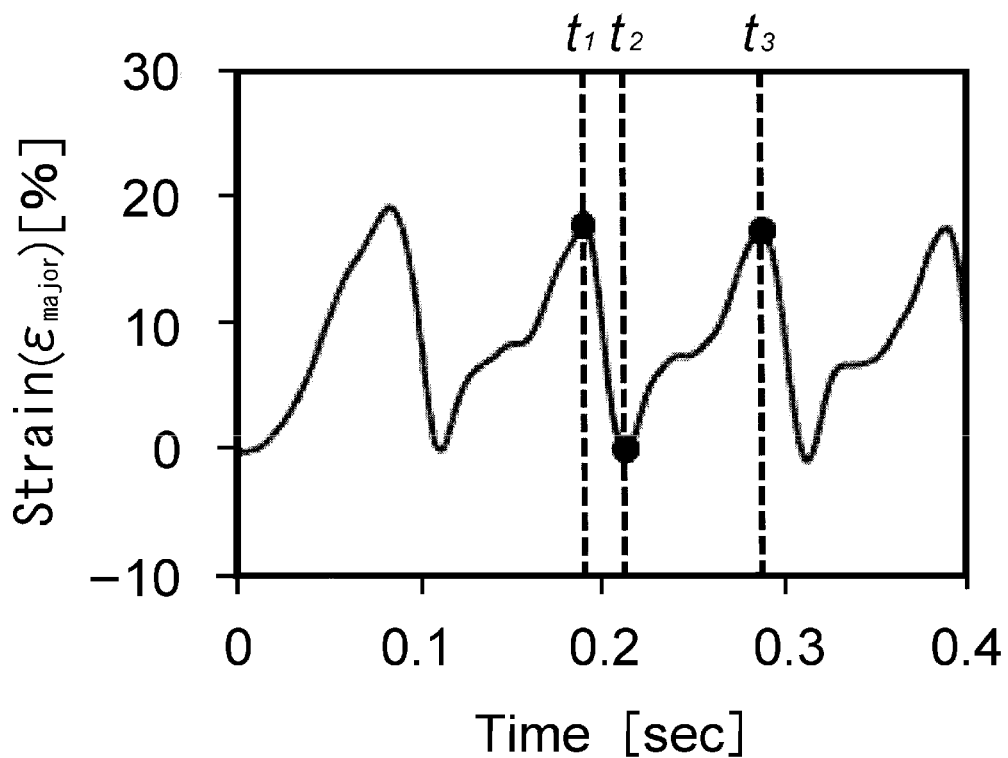
FIG. 3 is a graph of a preliminary test result.

Hereinafter, an outsole of the present invention and a shoe using the same are described.

In the present specification, a range of numeric values describing with the wording "to" means that the range of numeric values includes a value before "to" as a lower limit and a value after "to" as an upper limit. In the case where a plurality of lower limit values and a plurality of upper limit values are described separately, any lower limit value and any upper limit value can be selected and made fall within a range designated by "from" and "to".

[Outsole]

The outsole of the present invention is formed of a viscoelastic body containing a rubber component.

In the viscoelastic body, under conditions of a temperature of 23° C., a frequency of 10 Hz, a static strain of 10%, and a dynamic strain of 7%, a loss factor [tan δ] measured by a dynamic viscoelasticity measurement is 0.17 or more, and a storage elastic modulus [E'] measured by the dynamic viscoelasticity measurement is 5.7 MPa or less. In addition, the ratio of a tensile stress at 300% elongation to a tensile stress at 100% elongation [M300/M100] is 4.4 or more.

Hereinafter, the conditions of a temperature of 23° C., a frequency of 10 Hz, a static strain of 10%, and a dynamic strain of 7% may be referred to as "specific conditions" in some cases. The ratio of the tensile stress at 300% elongation to the tensile stress at 100% elongation may be referred to as "stress ratio" in some cases.

The loss factor [tan δ] and the storage elastic modulus [E'] under the conditions of a temperature of 23° C., a frequency of 10 Hz, a static strain of 10%, and a dynamic strain of 7% are values measured by a dynamic viscoelasticity measurement in accordance with JIS K 6394: 2007. Specific methods for measuring the loss factor [tan δ] and the storage elastic modulus [E'] are as described in Examples, and thus the methods shall be referred to Examples below.

Accordingly, the viscoelastic body of the present invention is a viscoelastic body achieving measurement of [tan δ] and [E'] under specific conditions and exhibiting a viscoelastic behavior under specific conditions.

The specific condition is based on the finding that a strain of the outsole at the time of use is more likely to fluctuate around 10% as described above. That is, tan δ and E' under the specific conditions of the viscoelastic body according to the present invention are determined by considering an actual use of the outsole. An outsole formed from a viscoelastic body satisfying tan δ≥0.17 and E'≤5.7 MPa under specific conditions is excellent in wet grip performance at the time of use.

Although the reason why the outsole of the present invention is excellent in wet grip performance is not clear, it is presumed as follows. It is considered that by using a viscoelastic body having a relatively large tan δ and a relatively small E' under specific conditions, a hysteresis frictional force generated when the outsole (viscoelastic body) rides over unevenness of a wet ground is large. That is, when an outsole of a shoe hits a protrusion of the wet ground during walking, the strain and stress in the outsole increase proportionally, and the stress rapidly decreases against the strain in a process in which the outsole rides over the protrusion and reaches a recess. Since such a hysteresis frictional force increases, it is estimated that an outsole having excellent wet grip performance can be obtained.

The viscoelastic body of the present invention may be any viscoelastic body as long as tan δ≥0.17 and E'≤5.7 MPa are satisfied under specific conditions. In the viscoelastic body, a loss factor [tan δ] measured under specific conditions is preferably 0.175 or more, more preferably 0.18 or more, further preferably 0.181 or more, particularly preferably 0.185 or more. The larger the loss factor [tan δ] is, the more desirable it is, so that there is no particular preferred upper limit thereof. A practical upper limit value of the loss factor [tan δ] of the viscoelastic body is usually 1.0.

In the viscoelastic body of the present invention, a storage elastic modulus [E'] measured under specific conditions is preferably 5.5 MPa or less, more preferably 5.45 MPa or less, further preferably 5.3 MPa or less. The smaller the storage elastic modulus [E'] is, the more desirable it is, so that there is no particular preferred lower limit thereof. A practical lower limit value of the storage elastic modulus [E'] of the viscoelastic body is usually 1.0 MPa.

The ratio of the tensile stress at 300% elongation to the tensile stress at 100% elongation [M300/M100] is a value obtained by a tensile stress measurement in accordance with JIS K 6251: 2010 at 23° C. under atmospheric pressure.

Specific methods for measuring the tensile stress [M100] at 100% elongation and the tensile stress [M300] at 300% elongation are as described in Examples, and thus the methods shall be referred to Examples below. The tensile stress [M100] at 100% elongation is internal stress when a viscoelastic body is extended to 100% (twice as long as the original length), and the tensile stress [M300] at 300% elongation is internal stress when the viscoelastic body is extended to 300% (four times the original length). The stress ratio [M300/M100] is obtained by the tensile stress at 300% elongation/the tensile stress at 100% elongation. Accordingly, the viscoelastic body according to the present invention is a viscoelastic body which can be extended to at least 300% without being broken by the tensile stress measurement in accordance with JIS K 6251 at 23° C. under atmospheric pressure.

The outsole formed from the viscoelastic body satisfying the stress ratio [M300/M100]≥4.4 is excellent in durability. Although the reason why the outsole of the present invention is excellent in durability is not clear, it is presumed as follows. It is considered that the tensile stress [M100] at 100% elongation is proportional to a crosslinking density of a rubber component, and the tensile stress [M300] at 300% elongation is proportional to the crosslinking density of the rubber component and a reinforcing effect of a component reinforcing the rubber component (for example, a reinforcing agent such as silica). A viscoelastic body having a relatively high stress ratio [M300/M100] has a large reinforcing effect, and therefore it is presumed that by using this, an outsole having excellent durability can be obtained.

The viscoelastic body of the present invention may be any viscoelastic body as long as the stress ratio [M300/M100] ≥4.4 is satisfied. The stress ratio [M300/M100] of the viscoelastic body is preferably 4.42 or more, more preferably 4.6 or more, further preferably 4.9 or more. The larger the stress ratio [M300/M100] is, the more desirable it is, so that there is no particular preferred upper limit thereof. A practical upper limit value of the stress ratio [M300/M100] is usually 10.0.

The outsole of the present invention includes a rubber component, satisfies tan δ≥0.17 and E'≤5.7 MPa under specific conditions, and is further formed from a viscoelastic body satisfying a stress ratio [M300/M100]≥4.4.

In the present invention, compositions of the viscoelastic body is not limited to particular compositions as long as the viscoelastic body satisfies the range of tan δ and the like as described above.

Hereinafter, compositions of the viscoelastic body forming an outsole of the present invention are specifically described.

A rubber component is a major component composing a viscoelastic body (outsole).

The rubber component includes such as rubbers and thermoplastic elastomers.

Examples of the rubbers include a diene rubber such as an isoprene rubber (IR), a butadiene rubber (BR), a chloroprene rubber (CR); a diene copolymer rubber such as a styrene-butadiene copolymer rubber (SBR), a styrene-isoprene copolymer rubber (SIR), and an acrylonitrile-butadiene copolymer rubber (NBR); and a non-diene rubber such as an ethylene-α-olefin copolymer rubber containing ethylene units and units consisting of an α-olefin having three or more carbon atoms, a urethane rubber, an acrylic rubber, and a silicone rubber. These rubbers can be used alone or in combination of two or more kinds. These copolymer rubbers may be block copolymers, or alternatively may be random copolymers. The random copolymers are preferable since the random copolymers have excellent bonding properties to a silane coupling agent.

Examples of the thermoplastic elastomers include, for example, a styrene-based elastomer such as a styrene-ethylene-butylene-styrene block copolymer (SEBS); an ethylene-vinyl acetate copolymer elastomer; an olefin-based elastomer; a urethane-based elastomer; an ester-based elastomer; a fluorine-based elastomer; a silicone-based elastomer; and a polyamide-based elastomer. These elastomers can be used alone or in combination of two or more kinds.

It is preferable that the viscoelastic body contains a styrene-butadiene copolymer rubber since an outsole having excellent wet grip performance and durability can be easily formed.

For example, the rubber component contained in the viscoelastic body is formed only of a styrene-butadiene copolymer rubber. Alternatively, the rubber component is formed of a styrene-butadiene copolymer rubber and rubber components other than a styrene-butadiene copolymer rubber. "The rubber component is formed only of a styrene-butadiene copolymer rubber" refers to the fact that mixing of a trace amount of other rubber components inevitably contained therein is permitted, and mixing of a significant amount of other rubber components is excluded.

When the rubber component is formed of a styrene-butadiene copolymer rubber and other rubber components (rubber components except for a styrene-butadiene copolymer rubber), the other rubber components can be appropriately selected from various rubbers (except for a styrene-butadiene copolymer rubber) or alternatively from various thermoplastic elastomers described above. As the other rubber components, a diene rubber and a copolymer rubber except for a styrene-butadiene copolymer rubber are preferably used, and in particular, a diene rubber such as a butadiene rubber is preferably used.

When the rubber component contained in the viscoelastic body is formed of a styrene-butadiene copolymer rubber (preferably a styrene-butadiene random copolymer rubber) and other rubber, the compounding ratio thereof is not limited to a particular ratio. In order to develop the effect of the styrene-butadiene copolymer rubber, it is preferable that a relatively large amount of the styrene-butadiene copolymer rubber is compounded. For example, the styrene-butadiene copolymer rubber is contained in an amount of preferably from 80% by mass to 100% by mass, more preferably more than 85% by mass and less than 100% by mass, relative to 100% by mass of the total of the rubber component.

The styrene-butadiene copolymer rubber includes a styrene unit and a butadiene unit in the molecular structure. Although the amount of styrene in the styrene-butadiene copolymer rubber is not limited to a particular amount, if the amount of styrene is excessively large or small, the wet grip performance may not be sufficiently improved. From this viewpoint, an amount of styrene contained in a styrene-butadiene copolymer rubber is preferably 40% by mass to 55% by mass, more preferably 40% by mass to 50% by mass, further preferably 41% by mass to 49% by mass, particularly preferably 42% by mass to 48% by mass, most preferably 43% by mass to 47% by mass.

The styrene unit and the butadiene unit of the styrene-butadiene copolymer rubber may be random copolymerization or block copolymerization. As described above, since it is possible to form an outsole having excellent bonding properties to a silane coupling agent and excellent wet grip performance and durability, it is preferable to use a random copolymer (that is, a styrene-butadiene random copolymer rubber).

The viscoelastic body of the present invention contains any suitable components other than the rubber components. For example, the viscoelastic body further contains silica and a silane coupling agent in addition to the rubber components.

The silica serves as a reinforcing agent which reinforces the rubber component. A viscoelastic body (outsole) having much more excellent durability can be formed by compounding silica.

As the silica, according to classification based on the method for production thereof, there are known dry silica obtained by burning silicon tetrachloride in a oxyhydrogen flame; wet silica obtained by neutralizing an alkali silicate with an acid; sol-gel process silica obtained by hydrolyzing an alkoxide of silicon in an acidic or alkaline water-containing organic solvent; colloidal silica obtained by electro-dialysis of an aqueous alkali silicate solution; and the like. In the present invention, these kinds of silica may be used alone or in combination of two or more kinds. Especially, wet silica is easier in handling as compared to other types of silica, and thus is preferably used as the silica.

The average particle size of the silica is not limited to a particular size, and is, for example, 5 nm to 500 nm, preferably 10 nm to 200 nm, more preferably 20 nm to 100 nm. Silica having a particle diameter in these ranges is preferred because such silica provides an excellent reinforcing property. Silica having an average particle diameter in the above-mentioned range can be obtained by preparation methods known in the art. These preparation methods include, for example, dry pulverization methods in which a jet mill, a ball mill, or the like is used to produce silica particles having a desired average particle diameter, and wet pulverization methods in which a disperser, a homogenizer, or the like is used to produce silica particles having a desired average particle diameter.

The average particle diameter of the silica is a volume average particle diameter, and can be measured using a laser diffraction particle size analyzer (manufactured by Seishin Enterprise Co., Ltd. under the trade name of "SK Laser Micron Sizer LMS-2000e").

The content of the silica is not limited to a particular content, and is, for example, 15 parts by mass to 60 parts by mass relative to 100 parts by mass of the rubber component. In particular, as the lower limit, the content of silica is preferably 20 parts by mass or more, more preferably 25 parts by mass or more, further preferably 30 parts by mass or more relative to 100 parts by mass of the rubber component. On the other hand, as the upper limit, the content of silica is preferably 55 parts by mass or less, more preferably 50 parts by mass or less, further preferably 45 parts by mass or less relative to 100 parts by mass of the rubber component. If the amount of silica is excessively small, it may be difficult to obtain a viscoelastic body having a stress ratio [M300/M100] of 4.4 or more. On the other hand, if the amount of silica is excessively large, the hardness increases, and it may be difficult to obtain a viscoelastic body satisfying the conditions of the loss factor [tan δ] and the storage elastic modulus [E'].

The silane coupling agent has in the molecular structure at least the following Formula (2) between the following Formula (1) and Formula (2). With the condition that the silane coupling agent includes a unit represented by Formula (2), the silane coupling agent may have a unit represented by the Formula (1) and units other than Formula (1) and Formula (2). Hereinafter, this silane coupling agent may be referred to as the "predetermined silane coupling agent" in some cases.

The predetermined silane coupling agent intervenes between the rubber component and the silica and has an effect of bonding them. By compounding such a silane coupling agent, a viscoelastic body satisfying the stress ratio [M300/M100]≥4.4 can be easily obtained.

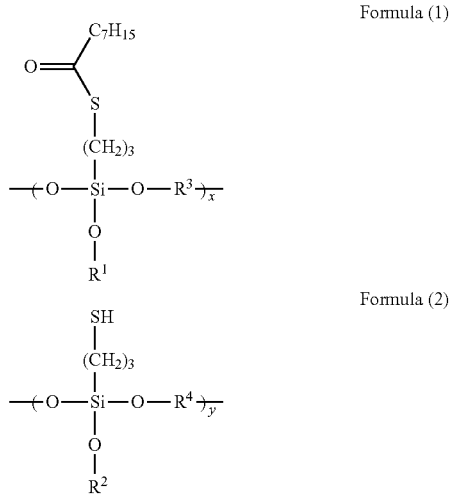

In Formula (1) and Formula (2), x and y each represent mol %, x is 0 to 30, y is 70 to 100. However, x+y=100. When x is 0, the predetermined silane coupling agent includes only units of Formula (2).

In Formula (1) and Formula (2), $R^1$ and $R^2$ each independently represent hydrogen, a hydroxy group, a halogen, a substituted or unsubstituted, linear or branched alkyl group, a substituted or unsubstituted, linear or branched alkenyl group, a substituted or unsubstituted, linear or branched alkynyl group, or a substituted or unsubstituted thiol group.

In Formula (1) and Formula (2), $R^3$ and $R^4$ each independently represent a covalent bond, a substituted or unsubstituted, linear or branched alkylene group, a substituted or unsubstituted, linear or branched alkenylene group, or a substituted or unsubstituted, linear or branched alkynylene group. However, when $R^3$ and $R^4$ are terminals, $R^3$ and $R^4$ each independently represent hydrogen, a substituted or unsubstituted, linear or branched alkyl group, a substituted or unsubstituted, linear or branched alkenyl group, or a substituted or unsubstituted, linear or branched alkynyl group, $R^1$ and $R^3$ may form a ring, and $R^2$ and $R^4$ may form a ring. That is, $R^3$ and $R^4$ each located at the terminal may form a ring with $R^1$ and $R^2$, respectively, and the predetermined silane coupling agent includes those having such a ring structure at the terminal.

In the present specification, the term "substituted or unsubstituted" refers to having a substituent or having no substituent. In addition, the term "covalent bond" refers to the fact that each of $R^3$ and $R^4$ has no group or atom.

In Formula (1) and Formula (2), it is preferable that x is 0 or more and less than 30, and y is more than 70 and 100 or less, it is more preferable that x is 0 to 25, and y is 75 to 100, it is further preferable that x is 0 to 20, and y is 80 to 100, and it is most preferable that x is 10 to 20, and y is 80 to 90.

Examples of the halogen include fluorine, chlorine, and bromine.

The carbon number of the linear or branched alkyl group is, for example, 1 to 30, preferably 1 to 12, more preferably 1 to 6, further preferably 1 to 4. Specific examples of the linear or branched alkyl group having 1 to 30 carbon atoms include such as a methyl group, an ethyl group an n-propyl group, an isopropyl group, an n-butyl group, an iso-butyl group, a sec-buthyl group, a tert-butyl group, a pentyl group, a hexyl group, a heptyl group, a 2-ethylhexyl group, an octyl group, a nonyl group, a decyl group, an undecyl group, a dodecyl group, a tridecyl group, a tetradecyl group, a pentadecyl group, and an octadecyl group.

When the linear or branched alkyl group has a substituent group (the substituted, linear or branched alkyl group), examples of the substituent include such as an alkyl group having 1 to 4 carbon atoms, an alkoxy group having 1 to 4 carbon atoms, a thioalkyl group having 1 to 4 carbon atoms, a hydroxyalkyl group having 1 to 4 carbon atoms, an alkylamino group having 1 to 4 carbon atoms, a phenylamino group having 6 to 20 carbon atoms, an acylamino group having 1 to 4 carbon atoms, a halogeno group, a nitro group, a cyano group, an acetamide group, a phosphate group, a —OH group, a —SO$_3$H group, a —COOH group, a —NH$_2$ group, and a —CONH$_2$ group.

The carbon number of the linear or branched alkenyl group is, for example, 2 to 30, preferably 2 to 12, more preferably 2 to 6, further preferably 2 to 4. Specific examples of the linear or branched alkenyl group having 2 to 30 carbon atoms include such as a vinyl group, a 1-propenyl group, a 2-propenyl group, a 1-butenyl group, a 2-butenyl group, a 1-pentenyl group, 2-pentenyl group, a 1-hexenyl group, a 2-hexenyl group, a 1-octenyl group, a decenyl group, an undecenyl group, a dodecenyl group, a tridecenyl group, a tetradecenyl group, a pentadecenyl group, and an octadecenyl group. When the alkenyl group has a substituent group (the substituted, linear or branched alkenyl group), examples of the substituent group may be the same as those of the alkyl group described above.

The carbon number of the linear or branched alkynyl group is, for example, 2 to 30, preferably 2 to 12, more preferably 2 to 6, further preferably 2 to 4. Specific examples of the linear or branched alkynyl group having 2 to 30 carbon atoms include such as an ethynyl group, a propynyl group, a butynyl group, a penthynyl group, a hexynyl group, a heptynyl group, an octynyl group, a nonynyl group, a decynyl group, an undecynyl group, and a dodecynyl group. When the alkynyl group has a substituent group (the substituted, linear or branched alkynyl group), examples of the substituent group may be the same as those of the alkyl group described above.

Examples of the thiol group is preferably a thiol group having 0 to 30 carbon atoms, more preferably a thiol group having 1 to 20 carbon atoms, further preferably a thiol group having 1 to 10 carbon atoms. Specific examples of the thiol group include such as a mercapto methyl group, a mercapto ethyl group, a 4-mercapto cyclohexl group, and a 4-mercapto phenyl group. When the thiol group has a substituent, examples of the substituent may be the same as those of the alkyl group described above.

The carbon number of the linear or branched alkylene group is, for example, 1 to 30, preferably 1 to 12, more preferably 1 to 6, further preferably 1 to 4. Specific examples of the linear or branched alkylene group having 1 to 30 carbon atoms include such as a methylene group, an ethylene group, a propylene group, a butylene group, a pentylene group, a hexylene group, a heptylene group, an octylene group, a nonylene group, a decylene group, an undecylene group, a dodecylene group, a tridecylene group, a tetradecylene group, a pentadecylene group, a hexadecylene group, a heptadecylene group, and an octadecylene group.

The carbon number of the linear or branched alkenylene group is, for example, 2 to 30, preferably 2 to 12, more preferably 2 to 6, further preferably 2 to 4. Specific examples of the linear or branched alkenylene group having 2 to 30 carbon atoms include such as a vinylene group, a 1-propenylene group, a 2-propenylene group, a 1-butenylene group, a 2-butenylene group, a 1-pentenylene group, a 2-pentenylene group, a 1-hexenylene group, a 2-hexenylene group, and a 1-octenylene group.

The carbon number of the linear or branched alkynylene group is, for example, 2 to 30, preferably 2 to 12, more preferably 2 to 6, further preferably 2 to 4. Specific examples of the linear or branched alkynylene group having 2 to 30 carbon atoms include such as an ethynylene group, a propynylene group, a butynylene group, a pentynylene group, a hexynylene group, a heptynylene group, a octynylene group, a nonynylene group, a decynylene group, an undecynylene group, and a dodecynylene group.

When the alkylene group, the alkenylene group, or the alkynylene group has a substituent (the substituted, linear or branched alkylene group, the alkenylene group, or the alkynylene group), examples of the substituent may be the same as those of the alkyl group described above.

Each of $R^1$ and $R^2$ in Formula (1) and Formula (2) is preferably a substituted or unsubstituted, linear or branched alkyl group, more preferably an unsubstituted, linear or branched alkyl group. Each of $R^3$ and $R^4$ in Formula (1) and Formula (2) is preferably a substituted or unsubstituted, linear or branched alkylene group, more preferably an unsubstituted, linear or branched alkylene group.

The content of the predetermined silane coupling agent is 1 part by mass to 20 parts by mass, preferably 1.5 parts by mass to 10 parts by mass, more preferably 2 parts by mass to 5 parts by mass relative to 100 parts by mass of silica. If the amount of silane coupling agent is excessively small, the hardness of the viscoelastic body may become too high. On the other hand, even if a large amount of silane coupling agent is added, its effect does not change, so that it is not preferable from the viewpoint of cost effectiveness to add a too large amount of silane coupling agent.

The viscoelastic body may contain various additives other than the rubber component, the silica, and the silane coupling agent.

Examples of additives include such as a processing oil, a crosslinking agent, a crosslinking aid, a crosslinking accelerator, a weather-resisting agent, an antioxidant, a UV absorber, a lubricant, an antistatic agent, a dispersing agent, a foaming agent, and a coloring agent. These are appropriately selected and compounded to the viscoelastic body.

The processing oil has a function of improving the flexibility of the viscoelastic body. In particular, when silica is compounded, a processing oil is preferably compounded to suppress an increase in hardness of the viscoelastic body. Examples of the processing oil include a mineral oil such as process oil and extender oil; and vegetable oil such as tall oil fatty acid, castor oil, and linseed oil. The content of the processing oil is not limited to a particular content, and is, for example, more than 0 parts by mass and 20 parts by mass or less, preferably 1 part by mass to 20 parts by mass, more preferably 3 parts by mass to 15 parts by mass relative to 100 parts by mass of the rubber component.

The crosslinking agent is compounded to crosslink a rubber component. The crosslinking agent is not limited to a particular one and examples thereof include such as a compound containing sulfur, and an organic peroxide. The amount of the crosslinking agent is not limited to a particular amount, and is, for example, 0.1 parts by mass to 5 parts by mass, preferably 0.3 parts by mass to 3 parts by mass relative to 100 parts by mass of the rubber component. The crosslinking aid is not limited to a particular one and examples thereof include such as zinc oxide, oxides of metals other than zinc, metal hydroxides, and fatty acids. The filler is not limited to a particular one and examples thereof include such as calcium carbonate, magnesium carbonate, magnesium oxide, and titanium oxide.

The viscoelastic body may be a foamed article or a non-foamed article. The foaming agent is compounded when the viscoelastic body (outsole) of the present invention is made into a foamed article. A foaming agent is compounded when foaming the composition by chemical foaming. For example, when physical foaming is employed for foaming the composition into a foamed article, a foamed viscoelastic body can be obtained without the foaming agent being compounded.

Examples of the foaming agent include such as sodium bicarbonate, ammonium bicarbonate, sodium carbonate, ammonium carbonate, azodicarbonamide (ADCA), dinitrosopentamethylenetetramine (DNPT), azobisisobutyronitrile, barium azodicarboxylate, and p,p'-oxybisbenzenesulfonyl hydrazine (OBSH).

For facilitating foaming, a foaming aid may be concurrently used with the foaming agent. Examples of the foaming aid include such as zinc oxide, urea, and urea derivatives.

When the viscoelastic body (outsole) is formed of a foam, its foaming ratio is not limited to a particular value and is, for example, 1.05 times to 1.4 times, and preferably 1.05 times to 1.2 times.

Although the density of the viscoelastic body (outsole) is not limited to a particular value, from the viewpoint of weight reduction, the density of the viscoelastic body is preferably 0.6 $g/cm^3$ or less, more preferably 0.55 $g/cm^3$ or less, further preferably 0.5 $g/cm^3$ or less. Although the lower limit of the density of the outsole is preferably as small as possible, the density of the outsole is usually 0.2 $g/cm^3$ or more, and preferably 0.3 $g/cm^3$ or more. The density is measured in accordance with JIS Z 8807.

The hardness (Shore-A) of the viscoelastic body (outsole) is not limited to a particular value and is, for example, 50 to 75, preferably 55 to 70, more preferably 60 to 65. A value of the hardness (Shore-A) can be measured by the method in accordance with JIS K 6253.

[Production of Outsole]

The outsole of the shoe can be obtained, for example, as follows.

In a preparation step, a rubber composition containing a rubber component, silica, a predetermined silane coupling agent, and, if necessary, an additive is kneaded. The temperature during kneading of the rubber composition is usually 120° C. to 160° C. The kneading can be carried out using an open roll, a banbury mixer, a kneader, a twin-screw extruder. In addition, sulfur and a vulcanization accelerator are mixed and kneaded and this mixing and kneading are usually carried out at a temperature of less than 120° C.

Then, in a molding step, the kneaded product is placed in a press mold having an appropriate shape and heated and molded, whereby a viscoelastic body having a desired shape can be obtained. The molding temperature is preferably 140° C. to 180° C., and more preferably 150° C. to 170° C.

In the molding step, the kneaded product may be introduced into an injection molding machine and subjected to injection molding, whereby a viscoelastic body having a desired shape can be obtained.

The viscoelastic body obtained by molding may be used as it is as an outsole. Alternatively, the viscoelastic body obtained by molding may be subjected to appropriate processing such as cutting to be used as an outsole.

[Structure of Shoe]

Figure 4:
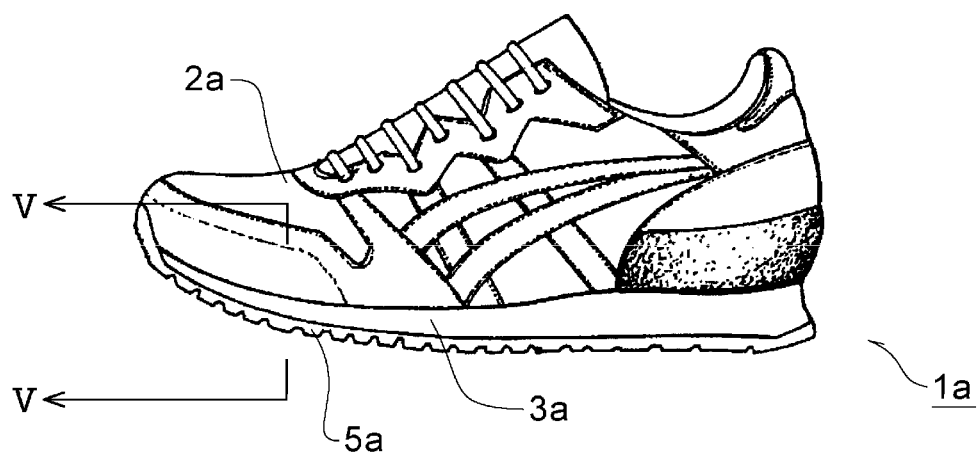
FIG. 4 is a side view of one embodiment of a shoe.
Figure 5:
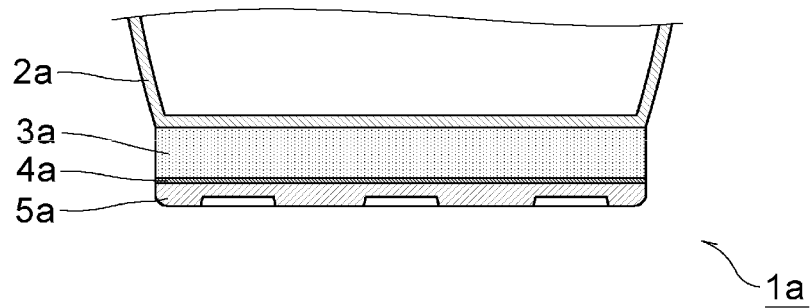
FIG. 5 is a cross sectional view taken along a line V-V of FIG. 4.

In FIGS. 4 and 5, a shoe 1a according to one embodiment of the present invention has an upper 2a covering an instep, a midsole 3a disposed beneath the upper 2a, and an outsole 5a disposed on the lower surface of the midsole 3a. The lower surface of the outsole 5a is usually formed in any suitable concave-convex shape.

The midsole 3a is attached to the lower end of the upper 2a. The outsole 5a is attached across the lower surface of the midsole 3a. Methods for attaching the midsole 3a and the outsole 5a are not limited to particular methods, and typically include gluing using an adhesive 4a. When the outsole 5a and the midsole 3a have the property of adhering to each other, it is also possible that they are directly adhered to each other. In addition, methods for attaching the upper 2a and the midsole 3a are not limited to particular methods, and include, for example, gluing using an adhesive. For the shoe 1a, the lower surface of the outsole 5a comes into contact with the ground.

Figure 6:
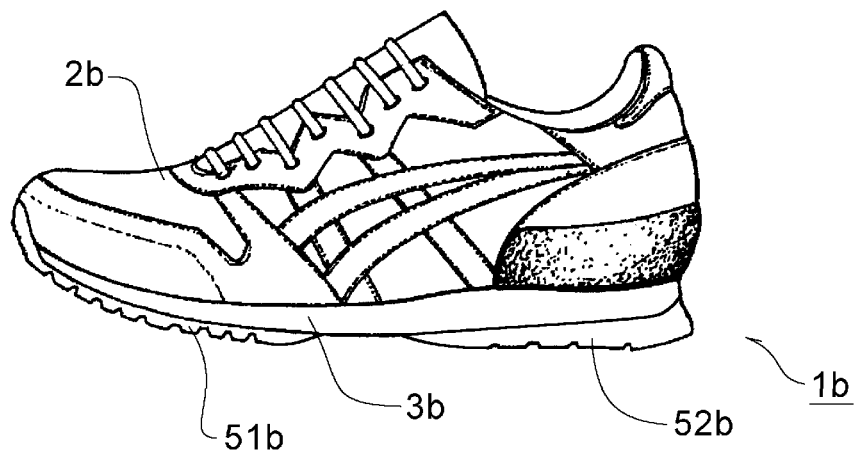
FIG. 6 is a side view of another embodiment of a shoe.

In FIG. 6, a shoe 1b according to another embodiment of the present invention has an upper 2b covering an instep, a midsole 3b disposed beneath the upper 2b, and outsoles 51b and 52b disposed on the lower surface of the midsole 3b. In the case of this shoe 1b, the respective areas of the outsoles 51b and 52b are smaller than that of the lower surface of the midsole 3b. Therefore, a part of the lower surface of the midsole 3b is exposed. The exemplary shoe 1b illustrated in FIG. 6 is provided with two outsoles 51b and 52b (a first outsole 51b and a second outsole 52b), which each have an area smaller than that of the midsole 3b, but the present invention is not limited to this example of shoe. For example, a shoe according to the present invention may be provided with a single outsole that has an area smaller than that of the midsole 3b, or with three or more outsoles that each have an area smaller than that of the midsole 3b (neither of these examples being illustrated in the drawings).

In FIG. 6, the first outsole 51b is attached to an anterior region of the lower surface of the midsole 3b, and the second outsole 52b is attached to a posterior region of the midsole 3b. Of course, the position of an outsole having a smaller area is not limited to an anterior or posterior region of the lower surface of the midsole 3b, and can be modified as appropriate. For the shoe 1b, the lower surface of the outsoles 51b and 52b and a part of the lower surface of the midsole 3b come into contact with the ground.

The respective lower surfaces of the outsoles 5a, 51b, and 52b are usually formed in a concave-convex shape as illustrated. However, the shape of the lower surface of the outsole is not limited to such a concave-convex shape, and all or at least one of the outsoles illustrated may have a lower surface formed in a flat shape (not illustrated). Also, all or at least one of the outsoles illustrated may have a lower surface dotted with a plurality of studs of a different structure (not illustrated).

The respective thicknesses of the outsoles 5a, 51b, and 52b are not limited to a particular thickness. These outsoles are each formed so as to have a thickness of usually 1 mm or more, preferably 2 mm to 10 mm. The respective thicknesses of the midsoles 3a and 3b are also not limited to a particular thickness. These midsoles are each formed so as to have a thickness of usually 3 mm or more, preferably 4 mm to 20 mm. Although there are cases where a thickness of the outsole is uniform in a plane direction of the outsole, the thickness of the outsole is usually non-uniform in the plane direction.

The above-mentioned outsole is a bottom element of a shoe that comes into contact with the ground, and can be appropriately used wholly or partially over the lower surface of the shoe, as described above. The outsole is not limited to a bottom element that comes into constant contact with the ground. The concept of the outsole also includes a bottom element of a shoe that does not come into contact with the ground in normal cases and becomes deformed by external forces (such as an impact when the foot touches the ground) so that the bottom element may come into contact with the ground. The bottom element of a shoe that becomes deformed by such external forces so that it may come into contact with the ground includes, for example, a reinforcing element such as a shank element and the like. The shank element is a bottom element that is disposed in a region corresponding to the arch of a foot.

[Use of Shoe]

Use of the shoe according to the present invention is not limited to particular use. The shoe of the present invention may be used as, for example, a trekking shoe used for walking in mountains and riversides; a shoe for various ball sports such as a soccer shoe or a rugby shoe; a running shoe such as a jogging shoe or a marathon shoe; a shoe for track and field; a shoe for sports in general; a walking shoe; and a flip flop.

The outsole of the present invention has excellent wet grip performance, particularly on an uneven ground. The shoe of the present invention having this outer sole is suitable for use as a trekking shoe, a shoe for ball sports, a running shoe, a shoe for track and field, and a walking shoe, and in particular, the shoe is more suitable for a trekking shoe for walking on rocky hills and rough unpaved grounds.

The outsole of the present invention having excellent wet grip performance shows excellent grip performance not only on a wet ground but also on a dry ground.

EXAMPLES

Hereinafter, the present invention will be described in more detail with reference to Examples and Comparative Examples. However, the present invention is not limited to the following Examples.

[Used Materials]

<Rubber Component>

BR: Butadiene rubber (trade name "NIPOL BR 1220" manufactured by Zeon Corporation).

SBR(1): Styrene-butadiene random copolymer rubber (trade name "JSR 1502" manufactured by JSR Corporation) having a styrene content of 23.5% by mass.

SBR(2): Styrene-butadiene random copolymer rubber (trade name "JSR 0202" manufactured by JSR Corporation) having a styrene content of 46.0% by mass.

SBR(3): Styrene-butadiene random copolymer rubber (trade name "HS60" manufactured by Yantai Shiyuan Rubber Co., Ltd.) having a styrene content of 60.0% by mass.

SBR(4): Styrene-butadiene block copolymer rubber (trade name "ASAPRENE 303" manufactured by Asahi Kasei Corporation) having a styrene content of 46.0% by mass.

IR: Isoprene rubber (trade name "IR2200" manufactured by Zeon Corporation).

NBR: Acrylonitrile-butadiene copolymer rubber (trade name "N240S" manufactured by JSR Corporation) having an acrylonitrile content of 26% by mass.

<Reinforcing Agent>

Silica: Wet silica with an average particle size of 17 nm. Product name "Ultrasil VN 3" manufactured by Degussa Ag.

<Silane Coupling Agents>

Silane coupling agent (1): Those having x of 0 mol % in Formula (1) and y of 100 mol % in Formula (2) (that is, those formed only of Formula (2)). Product name "NXT-Z100" manufactured by Momentiv Performance Materials, Inc. As the product name "NXT-Z100", for example, one in which in Formula (2), $R^2$ is —$CH_2CH_3$ and $R^4$ is —$CH_2CH_2$ can be used.

Silane coupling agent (2): Those having x of 30 mol % in Formula (1) and y of 70 mol % in Formula (2). However, a silane coupling agent in which the product name "NXT-Z100" described above and the product name "NXT-Z45" manufactured by Momentiv Performance Materials, Inc. (one having x of 55 mol % in Formula (1) and y of 45 mol % in Formula (2)) were mixed at a ratio of 5:6 (mass ratio) such that x in Formula (1) was 30 mol % and y in Formula (2) was 70 mol % was used.

Silane coupling agent (3): Those having x of 40 mol % in Formula (1) and y of 60 mol % in Formula (2). However, a silane coupling agent in which the product name "NXT-Z100" and the product name "NXT-Z45" were mixed at a ratio of 3:8 (mass ratio) such that x in Formula (1) was 40 mol % and y in Formula (2) was 60 mol % was used.

Silane coupling agent (4): Bis(3-triethoxysilylpropyl) tetrasulfide. Product name "Si 69" manufactured by Degussa Ag.

<Plasticizer>

Oil: Paraffin oil. Trade name "P-200" manufactured by JX Nippon Oil & Energy Corporation.

<Crosslinking Agent>

Sulfur: Trade name "Fine Powder Sulfur" manufactured by Hosoi Chemical Industry Co., Ltd.

<Additives>

Crosslinking accelerator aid: Zinc oxide. Trade name "Active zinc flower No. 2" manufactured by Honjo Chemical Corporation.

Activator: Polyethylene glycol. Trade name "PEG #4000" manufactured by NOF Corporation.

Adduct of dicyclohexylamine and ethylene glycol: Trade name "Acting SL" manufactured by Mitsubishi Chemical Corporation.

Antioxidant: 2,6-di-tert-butyl-4-methylphenol. Trade name "Nocrac 200" manufactured by Ouchi Shinko Chemical Industrial Co., Ltd.

Wax: Trade name "Ozonoc 33" manufactured by Ouchi Shinko Chemical Industrial Co., Ltd.

Crosslinking accelerators: 2-benzothiazolyl disulfide (trade name "NOCCELER DM-P" manufactured by Ouchi Shinko Chemical Industrial Co., Ltd.), tetramethylthiuram monosulfide (trade name "NOCCELER TS" manufactured by Ouchi Shinko Chemical Industrial Co., Ltd.), and N-oxydiethylene-2-benzothiazolylsulfenamide (trade name "NOCCELER MSA-G" manufactured by Ouchi Shinko Chemical Industrial Co., Ltd.).

Example 1

A rubber component, silica, a plasticizer, and a silane coupling agent were compounded at a ratio shown in Table 1 and kneaded at a discharge temperature of 135° C. to 155° C. using a kneader (DS3-10MWB-E type). Thereafter, the kneaded product was compounded with a crosslinking agent and an additive and further kneaded at a temperature of 60° C. to 80° C. using a 10-inch open roll.

Then, this kneaded product was pressed with a pressing machine at 160° C. and a pressure of about 15 MPa for about 5 minutes to produce a rubber sheet having a length of 125 mm, a width of 215 mm, and a thickness of 2 mm. Further, likewise, a cylindrical rubber piece having a diameter of 16 mm and a thickness of 6 mm was produced.

The rubber sheet having a thickness of 2 mm was produced to measure a storage elastic modulus [E'], the loss factor [tan δ], and the stress ratio [M300/M100]. That is, the rubber sheet having a thickness of 2 mm was used as a test piece (hereinafter referred to as a first test piece) for measuring E', tan δ, and M300/M100. The rubber sheet having a thickness of 2 mm was also used as a test piece for carrying out a dynamic friction test as described below.

The cylindrical rubber piece was used as a test piece (hereinafter referred to as a second test piece) for a wear resistance test.

A laminate (total thickness of about 7 mm) obtained by laminating and adhering the rubber sheet having a thickness of 2 mm to a resin foam having a thickness of 5 mm and mainly composed of ethylene vinyl acetate with an adhesive interposed therebetween was cut into a square shape of 25 mm×25 mm. This laminate was produced for carrying out a dynamic friction test (hereinafter referred to as a third test piece).

TABLE 1

| | | Example 1 | Example 2 | Example 3 | Example 4 | Example 5 | Example 6 | Comparative Example 1 | Comparative Example 2 |
|---|---|---|---|---|---|---|---|---|---|
| Composition | BR | | 5 | 10 | 15 | | | 30 | 70 |
| | SBR(1) (random ST content of 23.5%) | | | | | | 20 | | |
| | SBR(2) (random ST content of 46.0%) | 100 | 95 | 90 | 85 | 100 | 80 | 70 | 30 |
| | Silica | 40 | 40 | 40 | 40 | 40 | 40 | 40 | 40 |
| | Processing oil | 10 | 10 | 10 | 10 | 10 | 10 | 10 | 10 |
| | Silane coupling agent(1) (y = 100) | 3 | 3 | 3 | 3 | | 3 | 3 | 3 |
| | Silane coupling agent(2) (y = 70) | | | | | 3 | | | |
| | Crosslinking agent | 2 | 2 | 2 | 2 | 2 | 2 | 2 | 2 |
| | Additives | 7.3 | 7.3 | 7.3 | 7.3 | 7.3 | 7.3 | 7.3 | 7.3 |
| | Total | 162.3 | 162.3 | 162.3 | 162.3 | 162.3 | 162.3 | 162.3 | 162.3 |
| Average value of styrene content in SBR (%) | | 46.0 | 46.0 | 46.0 | 46.0 | 46.0 | 41.5 | 46.0 | 46.0 |
| Storage elastic modulus[E'] (MPa) | | 4.72 | 5.26 | 5.43 | 5.15 | 4.38 | 4.08 | 5.29 | 5.24 |
| Loss factor [tan δ] | | 0.224 | 0.203 | 0.183 | 0.181 | 0.204 | 0.187 | 0.140 | 0.087 |
| Stress Ratio [M300/M100] | | 5.14 | 4.93 | 4.98 | 4.43 | 4.46 | 5.46 | 4.51 | — |
| Dynamic friction coefficient | | 1.024 | 1.001 | 0.951 | 0.921 | 0.989 | 0.922 | 0.829 | 0.666 |
| DIN abrasion volume (mm³) | | 112 | 112 | 105 | 97 | 105 | 116 | 73 | 36 |
| Evaluation | Wet grip performance | Good | Good | Good | Good | Good | Good | Poor | Poor |
| | Durability | Good | Good | Good | Good | Good | Good | Good | Good |

Examples 2 to 6 and Comparative Examples 1 to 16

A rubber sheet (first test piece) and a rubber piece (second test piece) were produced in the same manner as in Example 1 except that types of a rubber component, silica, a plasticizer, and a silane coupling agent and the compounding ratio thereof were changed as shown in Tables 1 to 3.

The numerical values shown in the compositions of Tables 1 to 3 are all indicated in parts by mass.

TABLE 2

| | | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|
| Composition | BR | 100 | | | | | | |
| | SBR(1) (random ST content of 23.5%) | | | | | | 100 | 67 |
| | SBR(2) (random ST content of 46.0%) | | 100 | 100 | 100 | 100 | | 33 |
| | Silica | 40 | 40 | 40 | 10 | 70 | 40 | 40 |
| | Processing oil | 10 | 10 | 10 | 10 | 10 | 10 | 10 |
| | Silane coupling agent(1) (y = 100) | 3 | | | 0.75 | 5.25 | 3 | 3 |
| | Silane coupling agent(3) (y = 60) | | | 3 | | | | |

TABLE 2-continued

|  |  | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|
|  | Silane coupling agent(4) |  | 3 |  |  |  |  |  |
|  | Crosslinking agent | 2 | 2 | 2 | 2 | 2 | 2 | 2 |
|  | Additives | 7.3 | 7.3 | 7.3 | 7.3 | 7.3 | 7.3 | 7.3 |
|  | Total | 162.3 | 162.3 | 162.3 | 130.05 | 194.55 | 162.3 | 162.3 |
| Average value of styrene content in SBR (%) |  | — | 46.0 | 46.0 | 46.0 | 46.0 | 23.5 | 30.9 |
| Storage elastic modulus[E'] (MPa) |  | 4.77 | 5.30 | 4.58 | 2.05 | 7.36 | 4.26 | 4.09 |
| Loss factor [tan δ] |  | 0.084 | 0.225 | 0.224 | 0.155 | 0.238 | 0.141 | 0.150 |
| Stress Ratio [M300/M100] |  | — | 4.14 | 4.38 | 3.56 | 4.68 | 4.92 | 5.06 |
| Dynamic friction coefficient |  | 0.523 | 0.997 | 1.011 | 0.880 | 0.910 | 0.714 | 0.812 |
| DIN abrasion volume (mm$^3$) |  | 24 | 152 | 126 | 166 | 116 | 77 | 98 |
| Evaluation | Wet grip performance | Poor | Good | Good | Poor | Poor | Poor | Poor |
|  | Durability | Good | Poor | Poor | Poor | Good | Good | Good |

TABLE 3

|  |  | Comparative Example 10 | Comparative Example 11 | Comparative Example 12 | Comparative Example 13 | Comparative Example 14 | Comparative Example 15 | Comparative Example 16 |
|---|---|---|---|---|---|---|---|---|
| Composition | SBR(1) (random ST content of 23.5%) | 33 |  |  |  |  |  |  |
|  | SBR(2) (random ST content of 46.0%) | 67 |  |  |  |  |  |  |
|  | SBR(3) (random ST content of 60.0%) |  | 100 |  |  |  |  |  |
|  | SBR(4) (random ST content of 46.0%) |  |  | 100 | 100 | 100 |  |  |
|  | IR |  |  |  |  |  | 100 |  |
|  | NBR |  |  |  |  |  |  | 100 |
|  | Silica | 40 | 40 | 40 | 10 | 70 | 40 | 40 |
|  | Processing oil | 10 | 10 | 10 | 10 | 10 | 10 | 10 |
|  | Silane coupling agent(1) (y = 100) | 3 | 3 | 3 | 0.75 | 5.25 | 3 | 3 |
|  | Crosslinking agent | 2 | 2 | 2 | 2 | 2 | 2 | 2 |
|  | Additives | 7.3 | 7.3 | 7.3 | 7.3 | 7.3 | 7.3 | 7.3 |
|  | Total | 162.3 | 162.3 | 162.3 | 130.05 | 194.55 | 162.3 | 162.3 |
| Average value of styrene content in SBR (%) |  | 38.6 | 60.0 | 46.0 | 46.0 | 46.0 | — | — |
| Storage elastic modulus[E'] (MPa) |  | 4.18 | — | 6.96 | 2.94 | 9.09 | 2.95 | 4.56 |
| Loss factor [tan δ] |  | 0.168 | — | 0.230 | 0.146 | 0.253 | 0.109 | 0.163 |
| Stress Ratio [M300/M100] |  | 4.73 | — | 3.50 | 4.14 | — | 4.14 | 4.51 |
| Dynamic friction coefficient |  | 0.866 | 0.409 | 0.891 | 0.910 | 0.890 | 0.804 | 0.749 |
| DIN abrasion volume (mm$^3$) |  | 109 | 285 | 126 | 198 | 148 | 148 | 85 |
| Evaluation | Wet grip performance | Poor | Poor | Poor | Poor | Poor | Poor | Poor |
|  | Durability | Good | Poor | Poor | Poor | Poor | Poor | Good |

[Method for Measuring Storage Elastic Modulus and Loss Factor]

The storage elastic modulus [E'] and the loss factor [tan δ] were measured using each of the first test pieces of Examples 1 to 6 and Comparative Examples 1 to 16. The results are shown in Tables 1 to 3. In Comparative Example 11, it was impossible to measure the storage elastic modulus [E'] and the loss factor [tan δ]. This is believed to be due to the fact that the first test piece of Comparative Example 11 is too hard. In the present invention, Comparative Example 11 in which E' and tan δ cannot be easily measured under specific conditions shall be regarded as a material not satisfying the storage elastic modulus [E'] and the loss factor [tan δ] in the present invention. That is, Comparative Example 11 is a material not satisfying [tan δ]≥0.17 and [E']≤5.7 MPa.

The storage elastic modulus [E'] and the loss factor [tan δ] were measured in accordance with JIS K 6394:2007 (Rubber, vulcanized or thermoplastic—Determination of dynamic properties—General guidance) under the conditions of a temperature of 23° C., a frequency of 10 Hz, a static strain of 10%, and a dynamic strain of 7%.

Specifically, the first test piece was measured using a dynamic viscoelasticity measuring apparatus set under the following conditions.

Measuring equipment: A dynamic viscoelasticity measuring apparatus manufactured by Metravib, R.D.S. Trade name "DMA+300".

Measurement mode: Tension mode of sine wave distortion.

Distance between chucks: approximately 15 mm.
Temperature: 23±3° C.
Frequency: 10 Hz.
Load: Automatic static load.
Static strain: 10%.
Dynamic strain: 7%.

[Method for Measuring Stress Ratio]

The stress ratio [M300/M100] was measured using each of the first test pieces of Examples 1 to 6 and Comparative Examples 1 to 16. The results are shown in Tables 1 to 3. In Comparative Examples 2, 3, 11, and 14, it was impossible to extend the test piece to 300%, and the stress ratio [M300/M100] could not be measured. In the present invention, Comparative Examples 2, 3, 11, and 14 in which M300 cannot be easily measured shall be regarded as materials not satisfying the stress ratio [M300/M100] in the present invention. That is, Comparative Examples 2, 3, 11, and 14 are materials not satisfying the stress ratio [M300/M100]≥4.4.

The stress ratio [M300/M100] is obtained from the tensile stress [M100] at 100% elongation and the tensile stress [M300] at 300% elongation at 23° C. under atmospheric pressure.

The tensile stress [M100] at 100% elongation and the tensile stress [M300] at 300% elongation were measured in accordance with JIS K 6251:2010 (Rubber, vulcanized or thermoplastics—Determination of tensile stress-strain properties).

Specifically, both ends of the first test piece were gripped (distance between chucks: 70 mm) by a chuck of a constant-speed extension-type tensile tester with automatic recording (trade name "AGS-J 1 kN" manufactured by Shimadzu Corporation), the first test piece was stretched at an initial load of 0 N and a tensile speed of 50 cm/min at a temperature of 23±3° C. under atmospheric pressure, and a stress-strain curve was produced with a tensile tester. From this stress-strain curve, the stress occurring when the first test piece was elongated to 100% and the stress occurring when the first test piece was elongated to 300% were identified. From the M100 and M300, the stress ratio [M300/M100] was obtained.

[Dynamic Friction Test]

A dynamic friction test was carried out using each of the third test pieces of Examples 1 to 6 and Comparative Examples 1 to 16.

In the dynamic friction test, measurement was carried out using a self-made dead-weight type linear motion type friction tester. Specifically, a surface of a stone fixed onto a force plate and having a surface roughness Rz of 350 μm was made sufficiently wet with water. The third test piece was placed such that a rubber sheet faced the surface of the stone, and the third test piece was slid at a vertical load of 100 N and a sliding velocity of 0.03 m/sec at 23±3° C. under atmospheric pressure, whereby a dynamic friction coefficient was measured.

When the dynamic friction coefficient is 0.92 or more, it can be said that the wet grip performance is good.

[Abrasion Resistance Test]

An abrasion resistance test was carried out using each of the second test pieces of Examples 1 to 6 and Comparative Examples 1 to 16.

The abrasion resistance test was carried out by employing a DIN abrasion test in accordance with JIS K 6264-2:2005.

Specifically, a DIN abrasion tester (trade name "No. 151-OV" manufactured by Yasuda Seiki Seisaskusho, Ltd.) used conforms to JIS K 6264-2. In this tester, a drum having a diameter of 150 mm and a width of 460 mm and wrapped with #60 abrasive paper around its peripheral surface was rotated at a speed of 0.32 m/sec, and a second test piece was pressed against the abrasive paper around this drum with a load of 10 N to be worn.

Preliminary rubbing was carried out first in order to smooth a wear surface in the test. In the preliminary rubbing, the second test piece was pressed against the drum by 20 m at 23° C. under atmospheric pressure (that is, the drum was rotated for 62.5 seconds while the second test piece was pressed against the peripheral surface of the drum). Thereafter, the weight of the second test piece after the preliminary rubbing was measured, and the main test was carried out. In the main test, the second test piece after the preliminary rubbing was pressed against the drum by 40 m at 23° C. under atmospheric pressure (that is, the drum was rotated for 125 seconds while the second test piece was pressed against the peripheral surface of the drum). The weight of the second test piece after the main test was measured. A difference between the weight before the main test and the weight after the main test was obtained and was taken as a DIN abrasion volume ($mm^3$).

When the DIN abrasion volume is 120 or less, it can be said that the durability is good.

As is clear from Examples 1 to 6, the viscoelastic body satisfying tan δ≥0.17 and E' 5.7 MPa under the specific conditions and satisfying M300/M100≥4.4 is excellent in wet grip performance and durability.

On the other hand, in Comparative Examples 1 to 16 not satisfying at least one condition of tan δ≥0.17, E'≤5.7 MPa, and M300/M100≥4.4, it is found that at least one of the wet grip performance and the durability is insufficient.

INDUSTRIAL APPLICABILITY

The outsole of the present invention can be used to a constituting member of a shoe.

REFERENCE SIGNS LIST 1a, 1b Shoe
2a, 2b Shoe body
3a, 3b Midsole
5a, 51b, 52b Outsole

The invention claimed is:

1. An outsole being formed from a viscoelastic body containing a rubber component, a processing oil, a silica and a silane coupling agent,
the viscoelastic body having a loss factor [tan δ] measured by a dynamic viscoelasticity measurement under conditions of a temperature of 23° C., a frequency of 10 Hz, a static strain of 10%, and a dynamic strain of 7% being 0.17 or more, a storage elastic modulus [E'] measured by the dynamic viscoelasticity measurement being 5.7 MPa or less, and a ratio of a tensile stress at 300% elongation to a tensile stress at 100% elongation [M300/M100] being 4.4 or more, wherein the rubber component comprises a styrene-butadiene random copolymer rubber having an amount of styrene of 41% by mass to 49% by mass, and the styrene-butadiene random copolymer rubber is contained in an amount of more than 90% by mass and 100% by mass or less relative to 100% by mass of the rubber component, wherein the processing oil is contained in an amount of 1 part by mass to 20 parts by mass relative to 100 parts by mass of the rubber component, wherein the silica is contained in an amount of 15 parts by mass to 60 parts by mass relative to 100 parts by mass of the rubber component, and wherein the silane coupling agent includes molecular structure represented by the following Formula;

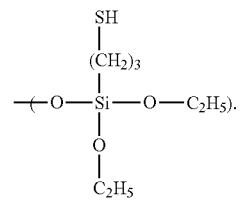

2. The outsole according to claim 1, wherein the styrene-butadiene random copolymer rubber is contained in an amount of more than 90% by mass and less than 100% by mass relative to 100% by mass of the rubber component.
3. The outsole according to claim 1, wherein the silane coupling agent is represented by the following Formula;
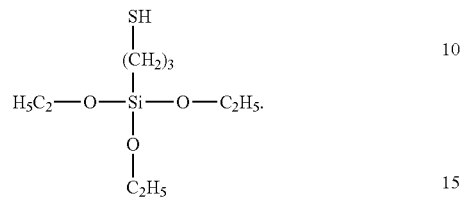
4. A shoe comprising the outsole according to claim 1.
* * * * *